(12) United States Patent
Schmitz et al.

(10) Patent No.: US 11,364,577 B2
(45) Date of Patent: Jun. 21, 2022

(54) RECLINER MECHANISM FOR SEAT ASSEMBLY AND METHOD OF MANUFACTURING

(71) Applicant: FISHER & COMPANY, INCORPORATED, St. Clair Shores, MI (US)

(72) Inventors: Ralph L. Schmitz, Clinton Township, MI (US); Sapan M. Poptani, Northville, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 0 days.

(21) Appl. No.: 16/740,874

(22) Filed: Jan. 13, 2020

(65) Prior Publication Data

US 2020/0253380 A1 Aug. 13, 2020

Related U.S. Application Data

(60) Provisional application No. 62/803,840, filed on Feb. 11, 2019.

(51) Int. Cl.
*B23P 11/02* (2006.01)
*B21D 39/00* (2006.01)
(Continued)

(52) U.S. Cl.
CPC ............. *B23P 11/02* (2013.01); *B21D 39/00* (2013.01); *B60N 2/2356* (2013.01); *B60N 2/933* (2018.02);
(Continued)

(58) Field of Classification Search
CPC ...... B60N 2/224; B60N 2/235; B60N 2/2356; B60N 2/2362; B60N 2/933; B60N 2/943;
(Continued)

(56) References Cited

U.S. PATENT DOCUMENTS 3,736,026 A   5/1973   Ziegler et al.
3,953,069 A   4/1976   Tamura et al.
(Continued)

FOREIGN PATENT DOCUMENTS

CA    2369034 A1    7/2002
CA    2869816 A1    10/2013
(Continued)

OTHER PUBLICATIONS

U.S. Appl. No. 16/914,569, filed Jun. 29, 2020, Sapan Mahendra Poptani et al.
(Continued)

*Primary Examiner* — Matthew P Travers
(74) *Attorney, Agent, or Firm* — Harness, Dickey & Pierce, P.L.C.

(57) ABSTRACT

A method for manufacturing a recliner mechanism may include movably attaching a first plate of a recliner heart to a second plate of the recliner heart, positioning a gap ring onto the first plate of the recliner heart, positioning an encapsulation ring around the first and second plates such that the gap ring is disposed axially between the first plate and the encapsulation ring, and removing at least a portion of the gap ring from between the first plate and the encapsulation ring to form a clearance gap between the first plate and the encapsulation ring.

11 Claims, 6 Drawing Sheets

(51) Int. Cl.
  *B60N 2/235*   (2006.01)
  *B60N 2/90*    (2018.01)
  *B60N 2/22*    (2006.01)

(52) U.S. Cl.
  CPC .............. *B60N 2/22* (2013.01); *Y10T 29/4981* (2015.01); *Y10T 29/4984* (2015.01)

(58) Field of Classification Search
  CPC ........... B60N 2/22; A47C 1/024; A47C 1/026; A47C 1/03238; A47C 1/03272–1/03274; Y10T 29/4981; Y10T 29/4984; B23P 11/02
  See application file for complete search history.

(56) References Cited

U.S. PATENT DOCUMENTS

| | | |
|---|---|---|
| 4,219,234 A | 8/1980 | Bell |
| 4,243,264 A | 1/1981 | Bell |
| 4,279,442 A | 7/1981 | Bell |
| 4,372,610 A | 2/1983 | Fisher, III et al. |
| 4,457,557 A | 7/1984 | Une |
| 4,484,779 A | 11/1984 | Suzuki |
| 4,579,387 A | 4/1986 | Bell |
| 4,634,182 A | 1/1987 | Tanaka |
| 4,684,174 A | 8/1987 | Bell |
| 4,705,319 A | 11/1987 | Bell |
| 4,720,145 A | 1/1988 | Bell |
| 4,733,912 A | 3/1988 | Secord |
| 4,747,641 A | 5/1988 | Bell |
| 4,795,213 A | 1/1989 | Bell |
| 4,822,100 A | 4/1989 | Bell |
| 4,919,482 A | 4/1990 | Landis et al. |
| 4,928,374 A | 5/1990 | Allen |
| 5,007,680 A | 4/1991 | Miyauchi et al. |
| 5,044,647 A | 9/1991 | Patterson |
| 5,154,476 A | 10/1992 | Haider et al. |
| 5,240,309 A | 8/1993 | Kojer |
| 5,248,184 A | 9/1993 | Morris |
| 5,265,937 A | 11/1993 | Allen |
| 5,393,116 A | 2/1995 | Bolsworth et al. |
| 5,419,616 A | 5/1995 | Paetzold |
| 5,435,624 A | 7/1995 | Bray et al. |
| 5,460,429 A | 10/1995 | Whalen |
| 5,489,141 A | 2/1996 | Strausbaugh et al. |
| 5,577,805 A | 11/1996 | Glinter et al. |
| 5,590,932 A | 1/1997 | Olivieri |
| 5,622,410 A | 4/1997 | Robinson |
| 5,628,215 A | 5/1997 | Brown |
| 5,660,440 A | 8/1997 | Pejathaya |
| 5,718,481 A | 2/1998 | Robinson |
| 5,769,493 A | 6/1998 | Pejathaya |
| 5,788,330 A | 8/1998 | Ryan |
| 5,813,724 A | 9/1998 | Matsuura et al. |
| 5,823,622 A | 10/1998 | Fisher, IV et al. |
| 5,857,659 A | 1/1999 | Kato et al. |
| 5,918,939 A | 7/1999 | Magadanz |
| 5,927,809 A | 7/1999 | Tame |
| 5,941,591 A | 8/1999 | Tsuge et al. |
| 5,947,560 A | 9/1999 | Chen |
| 5,979,986 A | 11/1999 | Pejathaya |
| 6,007,152 A | 12/1999 | Kojima et al. |
| 6,023,994 A | 2/2000 | Yoshida |
| 6,047,444 A | 4/2000 | Braun |
| 6,068,341 A | 5/2000 | Rink |
| 6,074,009 A | 6/2000 | Farino |
| 6,095,609 A | 8/2000 | Magadanz |
| 6,106,067 A | 8/2000 | Zhuang et al. |
| 6,123,380 A | 9/2000 | Sturt et al. |
| 6,139,104 A | 10/2000 | Brewer |
| 6,158,800 A | 12/2000 | Tsuge et al. |
| 6,161,899 A | 12/2000 | Yu |
| 6,199,953 B1 | 3/2001 | Chen |
| 6,250,704 B1 | 6/2001 | Garrido |
| 6,290,297 B1 | 9/2001 | Yu |
| 6,328,381 B1 | 12/2001 | Smuk |
| 6,345,867 B1 | 2/2002 | Hellrung et al. |
| 6,447,066 B1 | 9/2002 | Chabanne et al. |
| 6,511,129 B1 | 1/2003 | Minor et al. |
| 6,533,357 B2 | 3/2003 | Pospeshil et al. |
| 6,550,864 B1 | 4/2003 | Zarna et al. |
| 6,554,362 B1 | 4/2003 | Pospeshil |
| 6,634,713 B2 | 10/2003 | Nonomiya et al. |
| 6,669,296 B2 | 12/2003 | Moriyama et al. |
| 6,669,299 B2 | 12/2003 | Carlson et al. |
| 6,698,837 B2 | 3/2004 | Pejathaya et al. |
| 6,740,845 B2 | 5/2004 | Stol et al. |
| 6,758,525 B2 | 7/2004 | Uramichi |
| 6,854,802 B2 | 2/2005 | Matsuura et al. |
| 6,857,703 B2 | 2/2005 | Bonk |
| 6,860,562 B2 | 3/2005 | Bonk |
| 6,869,143 B2 | 3/2005 | Secord |
| 6,908,156 B1 | 6/2005 | Park et al. |
| 7,025,422 B2 | 4/2006 | Fast |
| 7,093,901 B2 | 8/2006 | Yamada |
| 7,097,253 B2 | 8/2006 | Coughlin et al. |
| 7,100,987 B2 | 9/2006 | Volker et al. |
| 7,121,624 B2 | 10/2006 | Pejathaya et al. |
| 7,152,924 B1 | 12/2006 | Nemoto et al. |
| 7,154,065 B2 | 12/2006 | Martukanitz et al. |
| 7,172,253 B2 | 2/2007 | Haverkamp |
| 7,198,330 B2 | 4/2007 | Wahlen et al. |
| 7,293,838 B2 | 11/2007 | Sugama et al. |
| 7,296,857 B2 | 11/2007 | Shinozaki et al. |
| 7,300,109 B2 | 11/2007 | Hofmann et al. |
| 7,306,286 B2 | 12/2007 | Syrowik et al. |
| 7,328,954 B2 | 2/2008 | Sasaki et al. |
| 7,360,838 B2 | 4/2008 | Smuk |
| 7,419,217 B2 | 9/2008 | Ishizuka |
| 7,458,639 B2 | 12/2008 | Thiel et al. |
| 7,490,907 B2 | 2/2009 | Nagura et al. |
| 7,503,099 B2 | 3/2009 | Pejathaya |
| 7,527,336 B2 | 5/2009 | Kienke et al. |
| 7,578,556 B2 | 8/2009 | Ohba et al. |
| 7,604,297 B2 | 10/2009 | Weber |
| 7,695,068 B2 | 4/2010 | Maeda et al. |
| 7,775,591 B2 | 8/2010 | Hahn et al. |
| 7,775,594 B2 | 8/2010 | Bruck et al. |
| 7,976,103 B2 | 7/2011 | Gamache et al. |
| 8,052,215 B2 | 11/2011 | Ito |
| 8,128,169 B2 | 3/2012 | Narita et al. |
| 8,360,527 B2 | 1/2013 | Lehmann |
| 8,430,454 B2 | 4/2013 | Tanguy et al. |
| 8,449,034 B2 | 5/2013 | Tame et al. |
| 8,985,690 B2 | 3/2015 | Yamada et al. |
| 9,102,248 B2 | 8/2015 | Matt |
| 9,108,541 B2 | 8/2015 | Assmann et al. |
| 9,221,364 B2 | 12/2015 | Nock et al. |
| 9,227,532 B2 | 1/2016 | Balzar et al. |
| 9,296,315 B2 | 3/2016 | Hellrung |
| 9,475,409 B2 | 10/2016 | Jiang et al. |
| 9,527,410 B2 | 12/2016 | Leconte |
| 9,527,419 B2 | 12/2016 | Hosbach et al. |
| 9,555,725 B2 | 1/2017 | Rothstein et al. |
| 9,573,493 B2 | 2/2017 | Nagura et al. |
| 9,616,779 B2 | 4/2017 | Barzen et al. |
| 9,623,774 B2 | 4/2017 | Yamada et al. |
| 9,701,222 B2 | 7/2017 | Kitou |
| 9,751,432 B2 | 9/2017 | Assmann |
| 9,873,357 B1 | 1/2018 | McCulloch et al. |
| 9,889,774 B2 | 2/2018 | Espinosa et al. |
| 10,150,387 B2 | 12/2018 | Hiemstra et al. |
| 10,279,709 B2 | 5/2019 | Suzuki et al. |
| 10,399,466 B2 | 9/2019 | Chang |
| 10,610,018 B1* | 4/2020 | Madhu ................ B60N 2/2362 |
| 10,787,098 B2 | 9/2020 | Smuk |
| 10,800,296 B2 | 10/2020 | Schmitz et al. |
| 10,864,830 B2 | 12/2020 | Schmitz et al. |
| 11,052,797 B2 | 7/2021 | Poptani et al. |
| 2002/0043852 A1 | 4/2002 | Uramichi |
| 2003/0127898 A1 | 7/2003 | Niimi et al. |
| 2003/0178879 A1 | 9/2003 | Uramichi |
| 2003/0230923 A1 | 12/2003 | Uramichi |
| 2004/0134055 A1 | 7/2004 | Aizaki |

(56) References Cited

U.S. PATENT DOCUMENTS

| | | |
|---|---|---|
| 2004/0145226 A1 | 7/2004 | Bonk |
| 2004/0195889 A1 | 10/2004 | Secord |
| 2005/0029806 A1 | 2/2005 | Yamanashi et al. |
| 2005/0253439 A1 | 11/2005 | Sasaki et al. |
| 2006/0006718 A1 | 1/2006 | Umezaki |
| 2006/0012232 A1 | 1/2006 | Coughlin et al. |
| 2006/0055223 A1 | 3/2006 | Thiel et al. |
| 2006/0170269 A1 | 8/2006 | Oki |
| 2007/0138854 A1 | 6/2007 | Paing et al. |
| 2007/0200408 A1 | 8/2007 | Ohta et al. |
| 2008/0001458 A1 | 1/2008 | Hoshihara et al. |
| 2008/0164741 A1 | 7/2008 | Sakamoto |
| 2009/0001797 A1 | 1/2009 | Neumann |
| 2009/0056124 A1* | 3/2009 | Krebs ................. F04C 2/18 29/888.025 |
| 2009/0072602 A1* | 3/2009 | Schuler ................ B60N 2/22 297/330 |
| 2010/0072802 A1* | 3/2010 | Smith ................ B60N 2/2252 297/362 |
| 2010/0096896 A1 | 4/2010 | Nonomiya |
| 2010/0231021 A1 | 9/2010 | Myers et al. |
| 2010/0283304 A1 | 11/2010 | Thiel |
| 2010/0308635 A1 | 12/2010 | Tame et al. |
| 2010/0320823 A1 | 12/2010 | Thiel |
| 2011/0068612 A1 | 3/2011 | Thiel |
| 2011/0127814 A1 | 6/2011 | Thiel |
| 2011/0227386 A1 | 9/2011 | Berndtson et al. |
| 2011/0309665 A1 | 12/2011 | Leighton et al. |
| 2012/0086253 A1 | 4/2012 | Nock et al. |
| 2012/0248841 A1 | 10/2012 | Hellrung et al. |
| 2013/0161995 A1 | 6/2013 | Yamada et al. |
| 2013/0207434 A1 | 8/2013 | Stilleke et al. |
| 2013/0270884 A1 | 10/2013 | Espinosa et al. |
| 2014/0008958 A1 | 1/2014 | Ito |
| 2014/0091607 A1 | 4/2014 | Maeda |
| 2014/0138998 A1 | 5/2014 | Christoffel et al. |
| 2014/0159458 A1 | 6/2014 | Lu et al. |
| 2014/0225411 A1 | 8/2014 | Matt |
| 2014/0239691 A1 | 8/2014 | Hellrung |
| 2014/0301682 A1 | 10/2014 | Leppla |
| 2015/0015044 A1 | 1/2015 | Teufel et al. |
| 2015/0069809 A1 | 3/2015 | Matt |
| 2015/0091354 A1* | 4/2015 | Enokijima ........... B60N 2/2252 297/354.12 |
| 2015/0123444 A1* | 5/2015 | Assmann ................ A61N 2/02 297/367 P |
| 2015/0266398 A1 | 9/2015 | Higashi et al. |
| 2015/0306986 A1 | 10/2015 | Jarry et al. |
| 2015/0321585 A1 | 11/2015 | McCulloch et al. |
| 2016/0023577 A1 | 1/2016 | Yamada et al. |
| 2016/0107546 A1 | 4/2016 | Barzen et al. |
| 2016/0339810 A1 | 11/2016 | Pluta et al. |
| 2017/0037945 A1 | 2/2017 | Maeda et al. |
| 2017/0080828 A1* | 3/2017 | Aktas ................... F16C 33/581 |
| 2017/0088021 A1 | 3/2017 | Noguchi et al. |
| 2017/0136921 A1 | 5/2017 | Dill et al. |
| 2018/0043800 A1 | 2/2018 | Maeda et al. |
| 2018/0056819 A1 | 3/2018 | Schmitz et al. |
| 2018/0103760 A1 | 4/2018 | Fujita et al. |
| 2018/0154802 A1 | 6/2018 | Ito |
| 2019/0255979 A1 | 8/2019 | Zahn et al. |
| 2019/0299821 A1 | 10/2019 | Maeda et al. |
| 2019/0329674 A1 | 10/2019 | Schmitz et al. |
| 2019/0337424 A1 | 11/2019 | Chang |
| 2019/0358694 A1 | 11/2019 | Yamakita |
| 2020/0047644 A1 | 2/2020 | Schmitz et al. |
| 2020/0070689 A1 | 3/2020 | Naik et al. |
| 2020/0282879 A1 | 9/2020 | Schmitz et al. |
| 2020/0331367 A1 | 10/2020 | Schmitz et al. |
| 2021/0039528 A1 | 2/2021 | Poptani et al. |
| 2021/0061139 A1 | 3/2021 | Schmitz et al. |

FOREIGN PATENT DOCUMENTS

| | | |
|---|---|---|
| CN | 1291566 A | 4/2001 |
| CN | 1457306 A | 11/2003 |
| CN | 1840382 A | 10/2006 |
| CN | 101148152 A | 3/2008 |
| CN | 101616820 A | 12/2009 |
| CN | 101925485 A | 12/2010 |
| CN | 202086037 U | 12/2011 |
| CN | 102442228 A | 5/2012 |
| CN | 103025568 A | 4/2013 |
| CN | 203228664 U | 10/2013 |
| CN | 203381519 U | 1/2014 |
| CN | 103702860 A | 4/2014 |
| CN | 203974603 U | 12/2014 |
| CN | 105189196 A | 12/2015 |
| CN | 205097989 U | 3/2016 |
| CN | 205130981 U | 4/2016 |
| CN | 107428269 A | 12/2017 |
| CN | 207291755 U | 5/2018 |
| CN | 112339625 A | 2/2021 |
| DE | 907608 C | 3/1954 |
| DE | 1098292 B | 1/1961 |
| DE | 4324734 A1 | 1/1995 |
| DE | 102007002366 B3 | 7/2008 |
| DE | 102008026176 A1 | 12/2009 |
| DE | 102008029438 A1 | 12/2009 |
| DE | 102011013163 A1 | 9/2012 |
| DE | 102011108976 A1 | 1/2013 |
| DE | 102012008940 A1 | 11/2013 |
| DE | 102017100374 A1 | 7/2017 |
| EP | 1074426 A2 | 2/2001 |
| GB | 1136097 A | 12/1968 |
| GB | 1546104 A | 5/1979 |
| JP | 2000084684 A | 3/2000 |
| JP | 2000153327 A | 6/2000 |
| JP | 2002119349 A | 4/2002 |
| JP | 5290789 B2 | 9/2013 |
| JP | 5555969 B2 | 7/2014 |
| KR | 100601809 B1 | 7/2006 |
| KR | 100817000 B1 | 3/2008 |
| KR | 20090035633 A | 4/2009 |
| KR | 20140001651 A | 1/2014 |
| KR | 101420164 B1 | 7/2014 |
| KR | 101655777 B1 | 9/2016 |
| WO | WO-9620848 A1 | 7/1996 |
| WO | WO-2011069107 A2 | 6/2011 |
| WO | WO-2013167240 A1 | 11/2013 |

OTHER PUBLICATIONS

U.S. Appl. No. 16/996,991, filed Aug. 19, 2020, Ralph L. Schmitz et al.

U.S. Appl. No. 17/181,189, filed Feb. 22, 2021, Ralph L. Schmitz et al.

U.S. Appl. No. 16/378,950, filed Apr. 9, 2019, Ralph L. Schmitz et al.

U.S. Appl. No. 16/524,325, filed Jul. 29, 2019, Ralph L. Schmitz et al.

U.S. Appl. No. 16/542,369, filed Aug. 16, 2019, Firoz Divan Naik et al.

U.S. Appl. No. 16/811,112, filed Mar. 6, 2020, Ralph L. Schmitz et al.

U.S. Appl. No. 16/842,135, filed Apr. 7, 2020, Ralph L. Schmitz et al.

Office Action regarding German Patent Application No. 102016114406.1, dated Apr. 27, 2020. Translation provided by Witte, Weller & Partner Patentanwälte mbB.

International Search Report regarding International Application No. PCT/US2020/021377, dated Jun. 30, 2020.

Written Opinion of the International Searching Authority regarding International Application No. PCT/US2020/021377, dated Jun. 30, 2020.

Office Action regarding Canadian Patent Application No. 2,812,408, dated Jun. 17, 2016.

(56) References Cited

OTHER PUBLICATIONS

SPI Lasers UK Ltd., "Opening new possibilities with single mode oscillation welding (CW)." Presented at: Laser World of Photonics China; Shanghai, China (Mar. 2008).
Office Action regarding German Patent Application No. 102019211855.0, dated Feb. 4, 2021. Partial translation provided by Bardehle Pagenberg Partnerschaft mbB.
Office Action regarding German Patent Application No. 102019212517.4, dated Mar. 11, 2021. Partial translation provided by Bardehle Pagenberg Partnerschaft mbB.
Office Action regarding Indian Patent Application No. 201921032346, dated Mar. 18, 2021.
Office Action regarding Chinese Patent Application No. 201910334168.9, dated Apr. 30, 2021. Translation provided by Unitalen Attorneys at Law.
Office Action regarding German Patent Application No. 102013103671.6, dated May 20, 2021. Translation provided by Witte, Weller & Partner Patentanwälte mbB.
Office Action regarding U.S. Appl. No. 16/996,991, dated Sep. 9, 2021.
Notice of Allowance regarding U.S. Appl. No. 16/996,991, dated Oct. 4, 2021.
Office Action regarding U.S. Appl. No. 16/542,369, dated Jul. 16, 2021.
Office Action regarding U.S. Appl. No. 16/542,369, dated May 17, 2021.
Notice of Allowance regarding U.S. Appl. No. 16/542,369, dated Oct. 10, 2021.
Office Action regarding U.S. Appl. No. 16/842,135, dated Sep. 16, 2021.
Office Action regarding U.S. Appl. No. 16/811,112, dated Sep. 3, 2021.
Office Action regarding German Application No. 102019110151.4, dated Jul. 12, 2021.
Office Action regarding German Patent Application No. 102020200559.1, dated Jul. 23, 2021.
First Chinese Office Action regarding Application No. 201910801476.8 dated Aug. 10, 2021. English translation provided by Unitalen Attorneys at Law.
Office Action regarding Chinese Patent Application No. 201910725351.1, dated Jul. 5, 2021.
Office Action regarding German Patent Application No. 10 2019 211 855.0, dated Nov. 25, 2021.
Office Action regarding Chinese Patent Application No. 2021120202214440, dated Dec. 7, 2021.
Office Action regarding Chinese Patent Application No. 201910801476.8, dated Dec. 17, 2021.
Office Action regarding Chinese Patent Application No. 202010305091.5, dated Jan. 27, 2022. Translation provided by Unitalen Attorneys at Law.

* cited by examiner

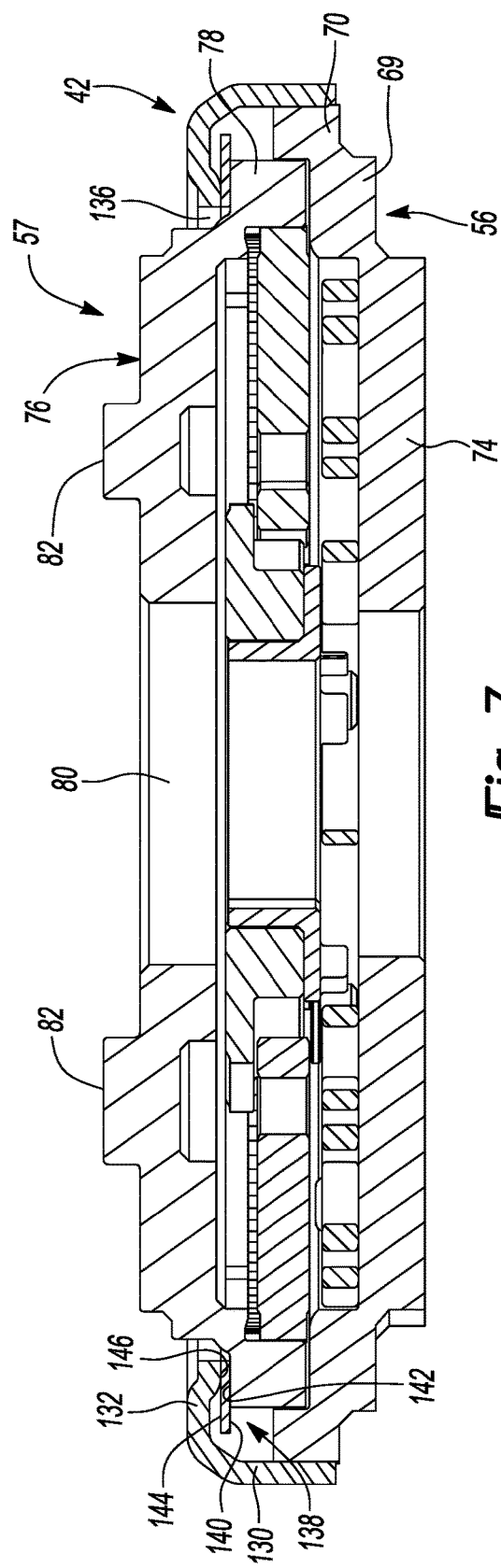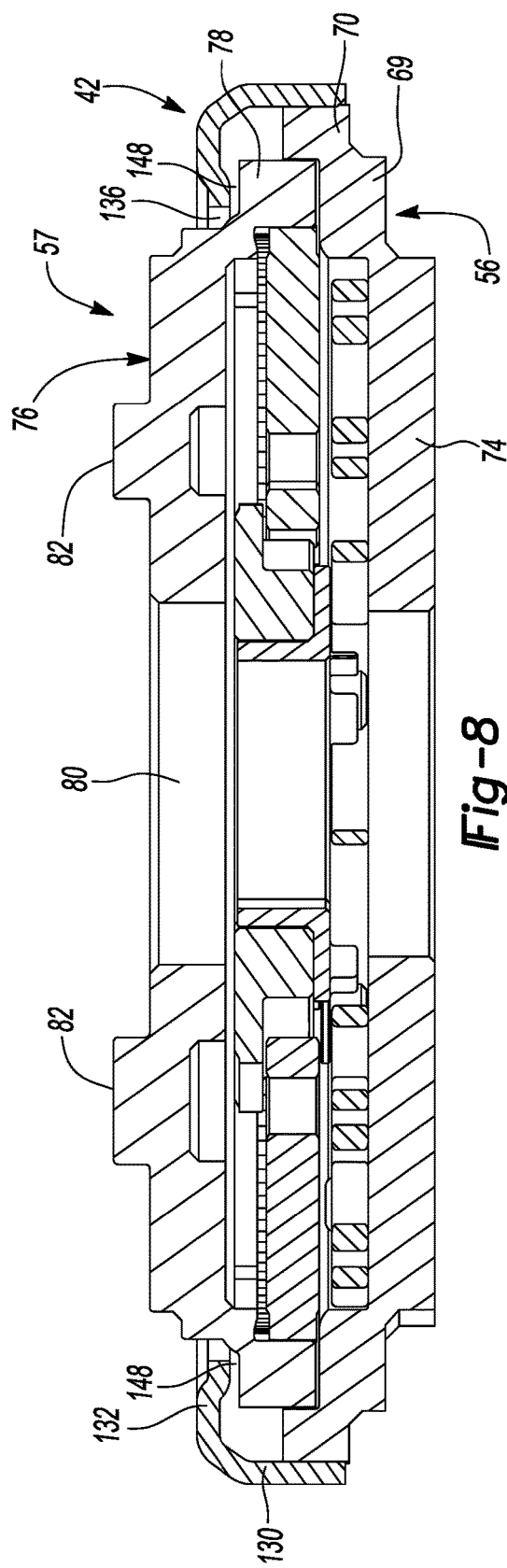

RECLINER MECHANISM FOR SEAT ASSEMBLY AND METHOD OF MANUFACTURING

CROSS-REFERENCE TO RELATED APPLICATIONS

This application claims the benefit of U.S. Provisional Application No. 62/803,840, filed on Feb. 11, 2019. The entire disclosure of the above application is incorporated herein by reference.

FIELD

The present disclosure relates to a recliner mechanism for a seat assembly and a method of manufacturing the recliner mechanism.

BACKGROUND

This section provides background information related to the present disclosure and is not necessarily prior art.

Vehicle seats often include a recliner mechanism that can rotate a seatback relative to a seat bottom. Some of such vehicle recliner mechanisms are time consuming to manufacture. The present disclosure provides a recliner mechanism that is less time consuming to manufacture and can be more reliably manufactured.

SUMMARY

This section provides a general summary of the disclosure, and is not a comprehensive disclosure of its full scope or all of its features.

In one form, the present disclosure provides a method for manufacturing a recliner mechanism. The method may include movably attaching a first plate of a recliner heart to a second plate of the recliner heart, positioning a gap ring onto the first plate of the recliner heart, positioning an encapsulation ring around the first and second plates such that the gap ring is disposed axially between the first plate and the encapsulation ring, and removing at least a portion of the gap ring from between the first plate and the encapsulation ring to form a clearance gap between the first plate and the encapsulation ring.

In some configurations of the method of the above paragraph, the first plate includes a plate surface and a rim extending around a periphery of the plate surface. The gap ring is positioned onto the rim of the first plate.

In some configurations of the method of any one or more of the above paragraphs, the encapsulation ring includes a body and a flange extending radially inwardly from an axial end of the body. The gap ring is positioned between the flange and the rim of the first plate.

In some configurations of the method of any one or more of the above paragraphs, the flange of the encapsulation ring is heated to remove at least the portion of the gap ring from between the flange and the rim.

In some configurations of the method of any one or more of the above paragraphs, the flange of the encapsulation ring is heated using at least one of a laser, a hot plate, and induction heating.

In some configurations of the method of any one or more of the above paragraphs, positioning the encapsulation ring around the first and second plates includes press-fitting the encapsulation ring onto the second plate.

In some configurations of the method of any one or more of the above paragraphs, the first plate is rotated relative to the second plate and the encapsulation ring to remove at least the portion of the gap ring from between the flange and the rim.

In some configurations of the method of any one or more of the above paragraphs, the method further includes providing lubricant between the encapsulation ring and the first plate before the encapsulation ring is heated.

In some configurations of the method of any one or more of the above paragraphs, the method further includes providing lubricant between the encapsulation ring and the first plate after the encapsulation ring is heated.

In some configurations of the method of any one or more of the above paragraphs, the gap ring is formed from a polymeric material and/or a paper material.

In some configurations of the method of any one or more of the above paragraphs, the encapsulation ring is fixed to the second plate before removing at least the portion of the gap ring. At least the portion of the gap ring is removed without moving the encapsulation ring relative to the second plate.

In some configurations of the method of any one or more of the above paragraphs, the first plate is disposed axially between the second plate and a flange of the encapsulation ring. The clearance gap is formed axially between the first plate and the flange.

In another form, the present disclosure provides a method for manufacturing a recliner mechanism. The method may include movably attaching a first plate of a recliner heart to a second plate of the recliner heart, positioning a gap ring onto the first plate of the recliner heart, positioning an encapsulation ring around the first and second plates such that the gap ring is disposed axially between the first plate and the encapsulation ring, removing at least a portion of the gap ring from between the first plate and the encapsulation ring to form a clearance gap between the first plate and the encapsulation ring, an attaching the encapsulation ring to the second plate of the recliner heart. A first surface of the gap ring contacts the first plate and a second surface of the gap ring opposite the first surface contacts the encapsulation ring.

In some configurations of the method of the above paragraph, the first plate includes a plate surface and a rim extending around a periphery of the plate surface. The gap ring is positioned onto the rim of the first plate.

In some configurations of the method of any one or more of the above paragraphs, the encapsulation ring includes a body and a flange extending radially inwardly from an axial end of the body. The gap ring is positioned between the flange and the rim of the first plate.

In some configurations of the method of any one or more of the above paragraphs, the flange of the encapsulation ring is heated to remove at least the portion of the gap ring from between the flange and the rim.

In some configurations of the method of any one or more of the above paragraphs, the flange of the encapsulation ring is heated using at least one of a laser, a hot plate, and induction heating.

In some configurations of the method of any one or more of the above paragraphs, the first plate is rotated relative to the second plate and the encapsulation ring to remove at least the portion of the gap ring from between the flange and the rim.

In some configurations of the method of any one or more of the above paragraphs, the method further includes providing lubricant between the encapsulation ring and the first plate before the encapsulation ring is heated.

In some configurations of the method of any one or more of the above paragraphs, the method further providing lubricant between the encapsulation ring and the first plate after the encapsulation ring is heated.

In some configurations of the method of any one or more of the above paragraphs, the gap ring is formed from a polymeric material and/or a paper material.

In some configurations of the method of any one or more of the above paragraphs, the encapsulation ring is fixed to the second plate before removing at least the portion of the gap ring. At least the portion of the gap ring is removed without moving the encapsulation ring relative to the second plate.

In some configurations of the method of any one or more of the above paragraphs, the first plate is disposed axially between the second plate and a flange of the encapsulation ring. The clearance gap is formed axially between the first plate and the flange.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a cross-sectional view of the recliner mechanism of FIG. 6 having the gap ring; and FIG. 8 is a cross-sectional view of the recliner mechanism of FIG. 6 without the gap ring.

Corresponding reference numerals indicate corresponding parts throughout the several views of the drawings.

DETAILED DESCRIPTION

Figure 1:
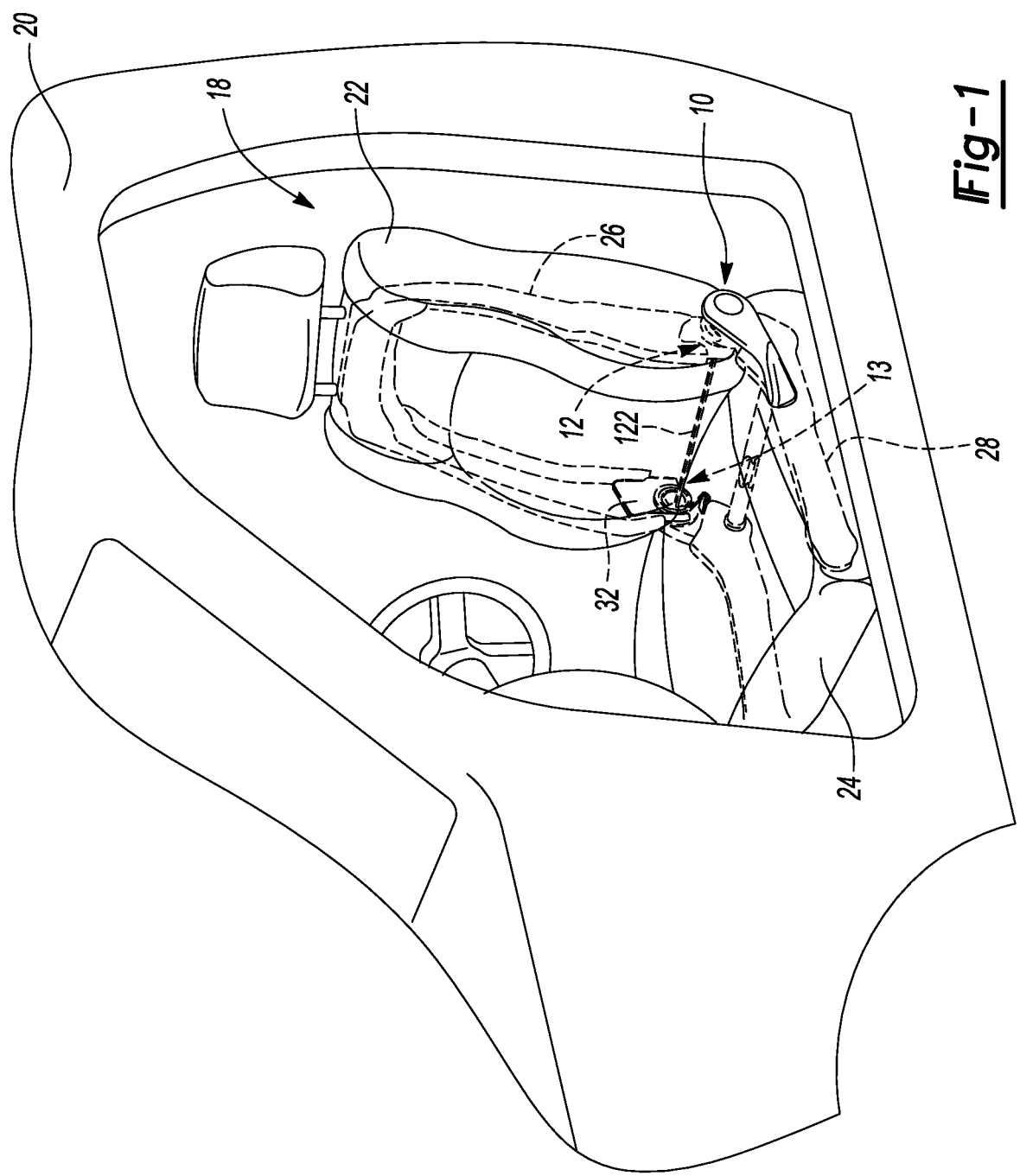
FIG. 1 is a partial perspective view of a vehicle having a seat incorporating a recliner assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
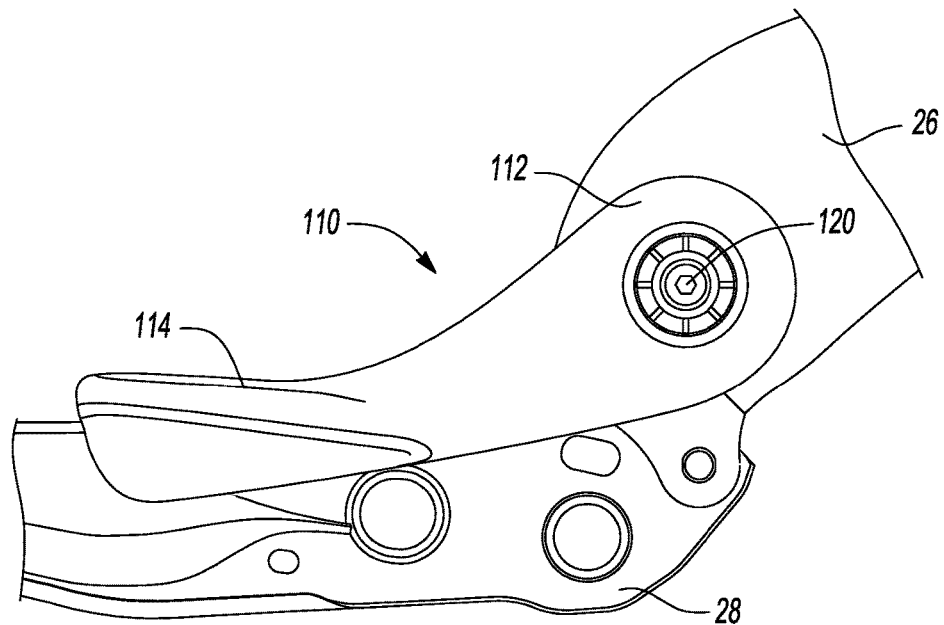
FIG. 2 is a side view of the recliner assembly of FIG. 1 with the seat in a reclined position.
Figure 3:
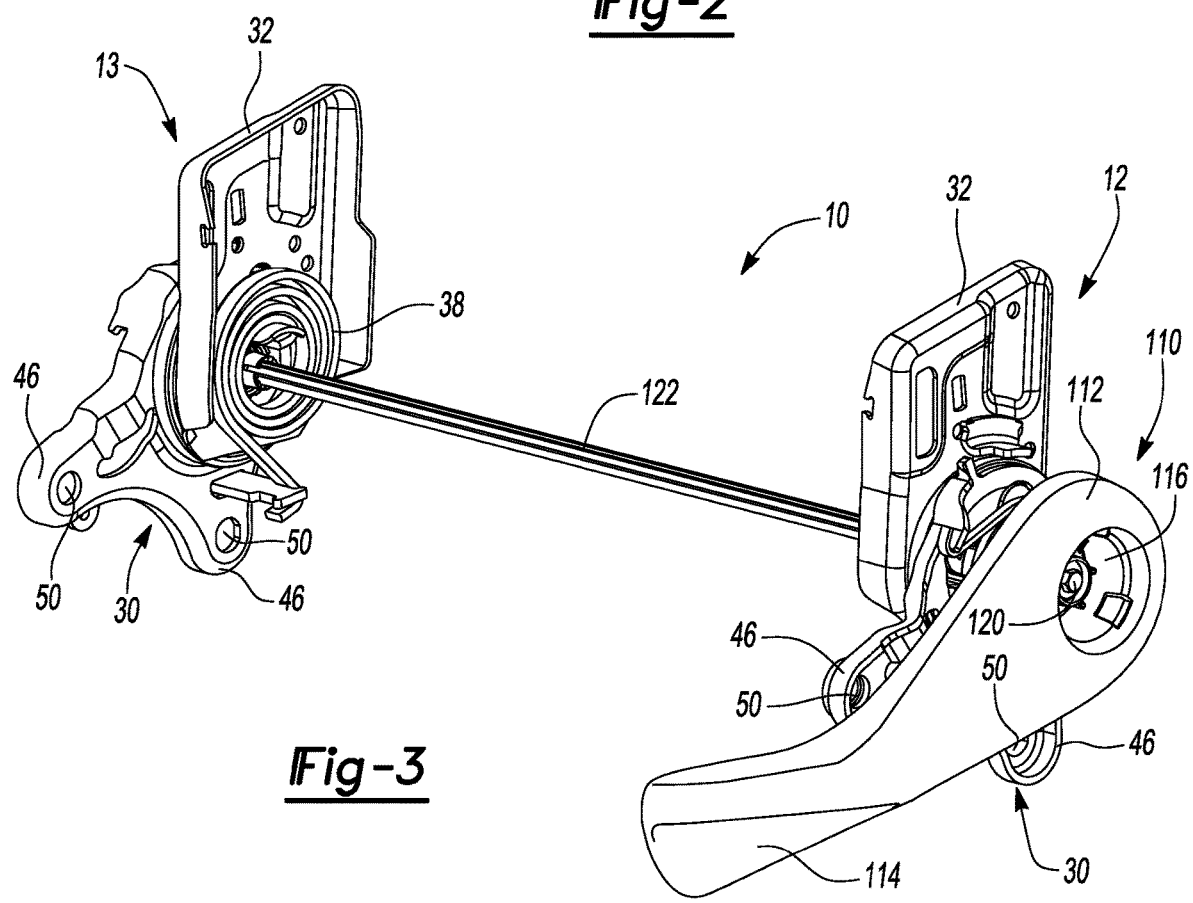
FIG. 3 is a perspective view of the recliner assembly of FIG. 1.

With reference to FIGS. 1-3, a recliner assembly 10 is provided that may be incorporated into a vehicle seat assembly 18 having a seatback 22 and a seat bottom 24. The seatback 22 and the seat bottom 24 may include a seatback frame 26 and a seat bottom frame 28, respectively. The seat assembly 18 may be positioned in a vehicle 20, as shown in FIG. 1. The recliner assembly 10 may include a first recliner mechanism 12 and a second recliner mechanism 13.

Figure 5:
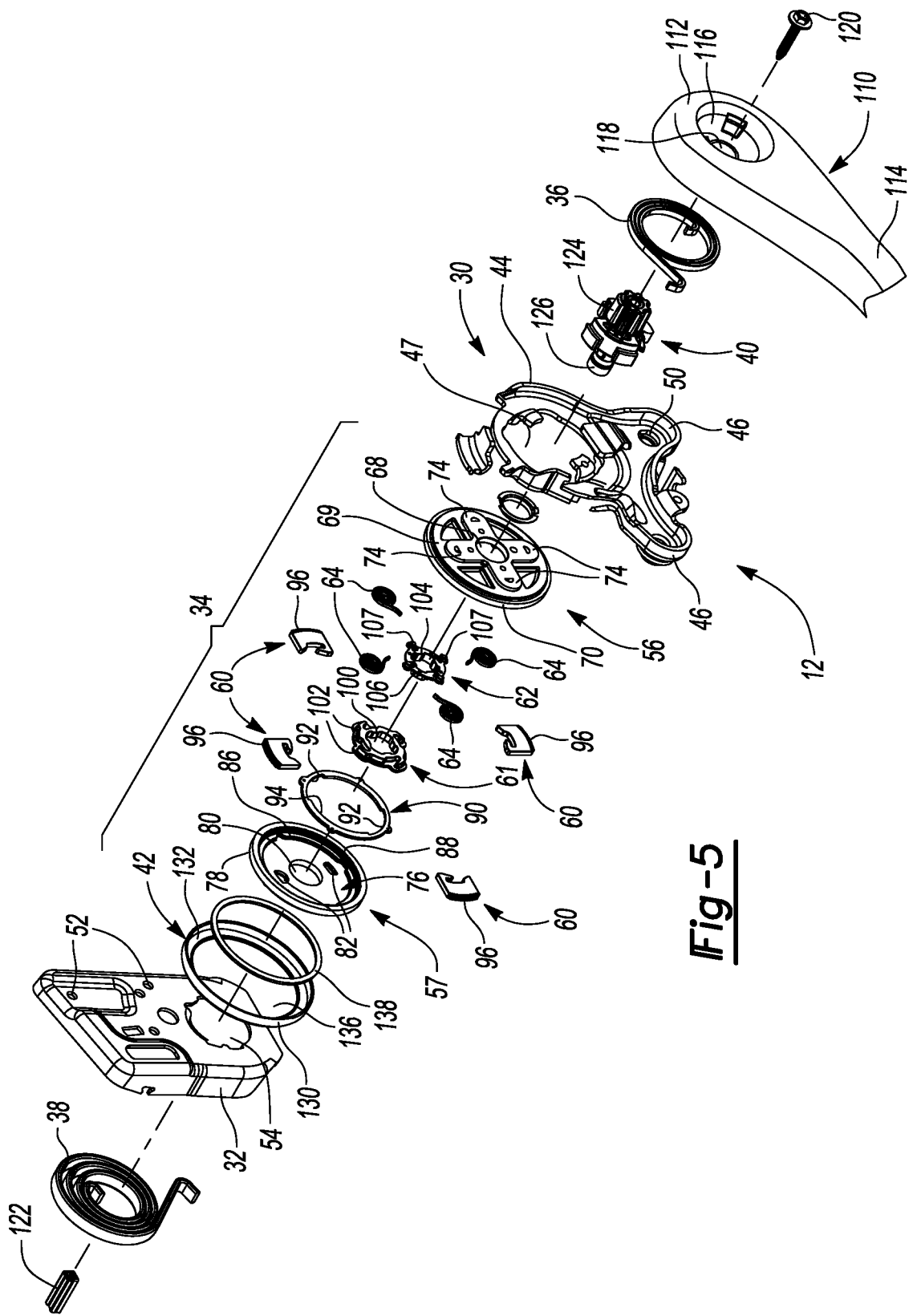
FIG. 5 is an exploded view of a portion of the recliner assembly of FIG. 1.

The first and second recliner mechanisms 12, 13 may be operable in a locked state preventing relative rotation between the seatback 22 and the seat bottom 24 and an unlocked state permitting relative rotation between the seatback 22 and the seat bottom 24 among an upright position (FIG. 1), a rearward reclined position (FIG. 2) and a forward dump position (not shown). As shown in FIG. 5, the first recliner mechanism 12 may include a first bracket 30, a second bracket 32, a recliner heart (or locking mechanism) 34, an outer coil spring 36, an inner coil spring 38, a hub 40 and an encapsulation ring 42.

Figure 4:
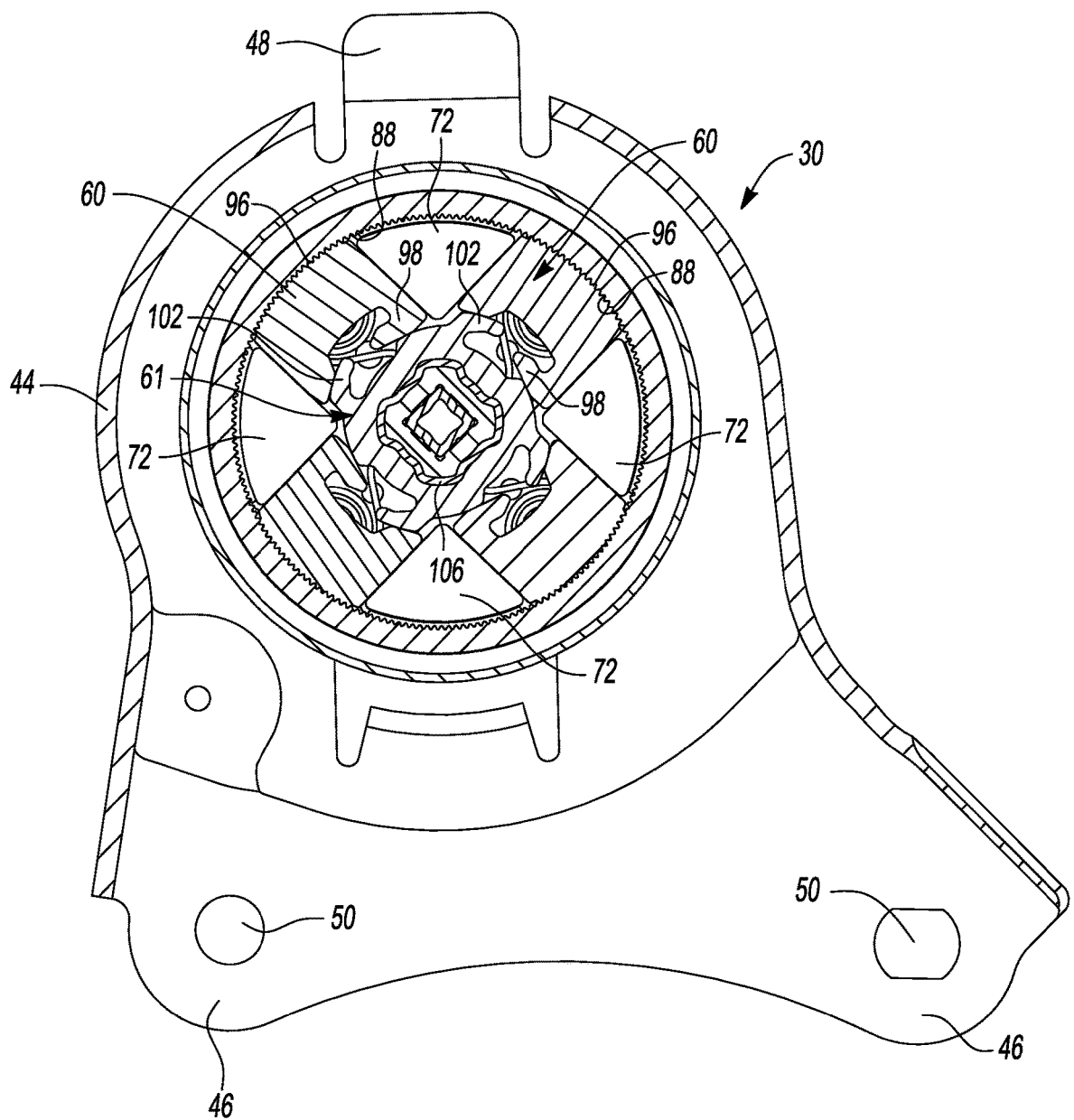
FIG. 4 is a cross-sectional view of a recliner mechanism of the recliner assembly of FIG. 1 in a locked state.

With reference to FIGS. 4 and 5, the first bracket 30 may include a generally round main body 44 and a pair of mounting lobes 46 (FIG. 5) that extend outward from the main body 44. The main body 44 may include a central aperture 47 and a tab 48. The mounting lobes 46 may include a plurality of apertures 50 through which fasteners (not shown) may extend to securely attach the first bracket 30 to the seat bottom frame 28 of the seat assembly 18.

As shown in FIG. 5, the second bracket 32 may be generally rectangular and may include a plurality of apertures 52 and a central aperture 54. Fasteners (not shown) may extend through the plurality of apertures 52 to securely attach the second bracket 32 to the seatback frame 26 of the seat assembly 18.

With reference to FIG. 5, the recliner heart 34 may be mounted to the first and second brackets 30, 32 and may include a guide plate 56, a ratchet plate or gear plate 57, a plurality of pawls 60, a cam 61, a connector disk 62 and a plurality of coil springs 64. The recliner heart 34 may be operable to lock the first recliner mechanism 12, thus preventing relative rotation between the seatback 22 and the seat bottom 24, and to also unlock the first recliner mechanism 12, thus permitting relative rotation between the seatback 22 and the seat bottom 24.

The guide plate 56 may be mounted to the first bracket 30. As shown in FIG. 5, the guide plate 56 may be a generally round, flat disk with a central aperture 68, a plate surface 69 and a rim 70. The central aperture 68 may extend through a center portion of the plate surface 69. The plate surface 69 may include a plurality of triangular-shaped bosses 72 (FIG. 4), a plurality of protrusions 74 (FIG. 5) and first recesses (not shown). The plurality of bosses 72 may extend from the plate surface 69. The plurality of protrusions 74 may extend from the plate surface 69 opposite the direction of the plurality of bosses 72 and may be disposed radially around the aperture 68. Each first recess is disposed between two of the plurality of bosses 72. The rim 70 may extend 360 degrees around a periphery of the plate surface 69.

Figure 6:
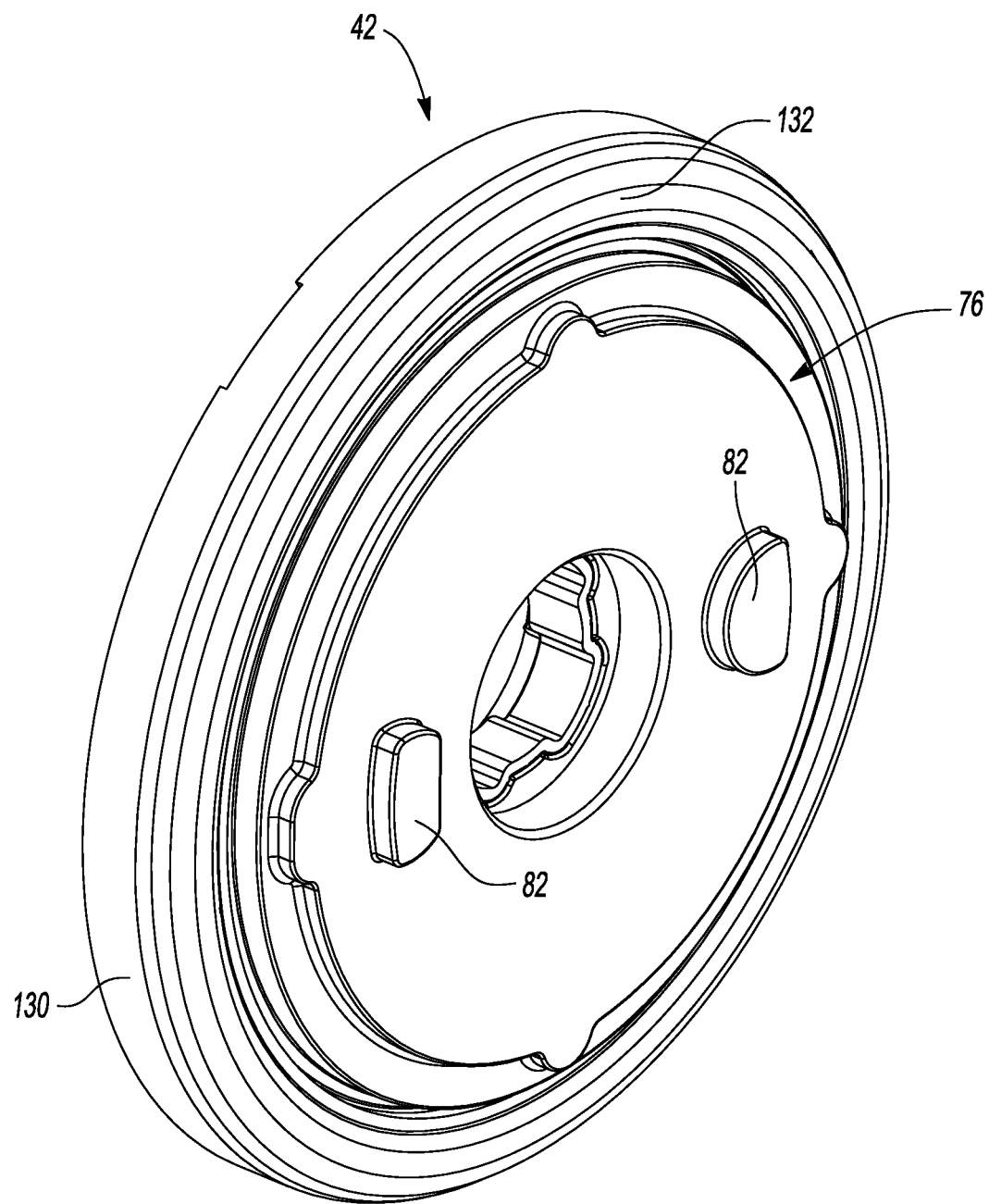
FIG. 6 is a perspective view of the recliner mechanism of the recliner assembly assembled.

The ratchet plate 57 may be rotationally fixed to the seatback 22 and may include a plate surface 76 and a rim 78. With reference to FIGS. 5 and 6, the plate surface 76 may include an aperture 80 (FIG. 5) extending through a center portion thereof and a plurality of projections 82 extending from the plate surface 76 opposite the direction of the rim 78. The plurality of projections 82 may be received in corresponding grooves formed in a periphery of the central aperture 54 of the second bracket 32 once the recliner heart 34 is mounted to the second bracket 32.

As shown in FIG. 5, the rim 78 may extend 360 degrees around a periphery of the plate surface 76 and may include an inner surface having a lobe 86 and teeth 88. The lobe 86 may extend 360 degrees around the inner surface of the rim 78 and may also project radially inwardly therefrom. The lobe 86 may also define a slot that extends 360 degrees around the inner surface of the rim 78. The teeth 88 may be adjacent to the lobe 86 and extend 360 degrees around the inner surface of the rim 78. A control ring 90 may be received in the slot defined by the lobe 86 and may include cut-outs 92 and an inner guide surface 94. The plurality of pawls 60 may selectively engage the cut-outs 92 when the recliner heart 34 is in the locked position and the inner guide surface 94 when the recliner heart 34 is in the unlocked position.

The plurality of pawls 60 may be radially disposed around the central aperture 68 of the guide plate 56 and may be slidably mounted within the first recesses (not shown) of the guide plate 56. An edge of each pawl 60 may include a plurality of teeth 96 adapted for meshing engagement with the teeth 88 of the ratchet plate 57. Each pawl 60 may also include a latch 98 at an end opposite the teeth 96.

The cam 61 may be a generally round disk having an aperture 100 and a plurality of radial latch protrusions 102 arranged around the aperture 100. The cam 61 is rotatable relative to the pawls 60 and the ratchet plate 57 such that the latch protrusions 102 can selectively engage the latches 98 of the pawls 60 to move the pawls 60 out of engagement with the teeth 88 of the ratchet plate 57 (i.e., into the unlocked state).

The connector disk 62 is engaged with the cam 61 and the hub 40. The connector disk 62 may include a disk portion 104 (FIG. 5) and an extrusion 106 (FIGS. 4 and 5) extending perpendicularly from the disk portion 104. The disk portion 104 may have a plurality of flanges 107 extending therefrom. Each flange 107 is engaged with a corresponding one of the coil springs 64 disposed in a second recess formed by the plurality of protrusions 74. Because each flange 107 is engaged to the corresponding spring 64, the connector disk 62 rotationally biases the cam 61 in a manner that causes the latch protrusions 102 to force the pawls 60 radially outwardly into the locked state, whereby the teeth 88 of the pawls 60 engage the teeth 88 of the ratchet plate 57.

The extrusion 106 of the connector disk 62 is engaged with the hub 40 and the cam 61 such that rotation of the hub 40 causes rotation of the cam 61 to move the pawls 60 radially into and out of engagement with the teeth 88 of the ratchet plate 57.

As shown in FIGS. 2, 3 and 5, a hand lever 110 may include a hub portion 112 and a handle portion 114. The hub portion 112 may include a recess 116. The recess 116 may include an aperture 118 (FIG. 5) through which a fastener 120 (e.g., a screw; shown in FIGS. 2, 3 and 5) extends. The handle portion 114 may extend outward from the hub portion 112 and may be shaped to provide a comfortable gripping surface that a user can grip to actuate the hand lever 110. The hand lever 110 may be securely attached to the hub 40, so that a rotational movement of the hand lever 110 causes the hub 40 to rotate. This rotational movement may function to lock and unlock the first and second recliner mechanisms 12, 13 to selectively prevent and allow rotational motion of the seatback 22 relative to the seat bottom 24.

A cross member 122 may be a generally rectangular (e.g., square) profile and may extend in a cross-vehicle direction. As shown in FIG. 3, the cross member 122 may connect the first recliner mechanism 12 to the second recliner mechanism 13, and may transmit rotational motion of the first recliner mechanism 12 to the second recliner mechanism 13 to move the second recliner mechanism 13 between the locked and unlocked states simultaneously with motion of the first recliner mechanism 12 between the locked and unlocked states. That is, the cross member 122 transmits torque from the hand lever 110 to the second recliner mechanism 13.

The outer coil spring 36 may exert a torsional force that biases the first recliner mechanism 12 toward a locked state. The outer coil spring 36 may wrap around the hub 40 and engage the first bracket 30 and the hand lever 110. The inner coil spring 38 may extend around the cross member 122 and may engage the first and second brackets 30, 32 to rotationally bias the seatback 22 toward the upright position relative to the seat bottom 24.

The hub 40 may extend through the length of the recliner heart 34 and may include a first end 124 and a second end 126. The first end 124 may engage the hand lever 110 such that the hub 40 and the hand lever 110 are rotationally fixed to each other. The fastener 120 may extend through the hand lever 110 and threadably engage the first end 124 of the hub 40. The second end 126 may include an aperture that receives and end of the cross member 122. The cross-sectional shape of the aperture generally corresponds to the cross-sectional shape of the cross member 122 such that the cross member 122 and the hub 40 are rotationally fixed relative to each other. To enable the seatback 22 to pivot relative to the seat bottom 24, a user may pivot the hand lever 110 in a clockwise direction (relative to the view shown in FIG. 4) thus rotating the hub 40 (and consequently the cross member 122). Accordingly, clockwise rotation of the cross member 122 causes the cam 61 to similarly rotate in a clockwise direction relative to the plurality of pawls 60, overcoming a counterclockwise rotational bias of the outer coil spring 36.

As shown in FIG. 5, the encapsulation ring 42 may be disposed between the first and second brackets 30, 32. As shown in FIGS. 6-8, the encapsulation ring 42 may also be press-fitted onto the guide plate 56 of the recliner heart 34 such that the encapsulation ring 42 covers the recliner heart 34 at a periphery thereof, thereby preventing debris and fluid from damaging the recliner heart 34. Additionally or alternatively, the encapsulation ring 42 may be welded to the guide plate 56 of the recliner heart 34. The encapsulation ring 42 may include a body 130 and a flange 132. The flange 132 may extend radially inwardly from an axial end of the body 130 to define an opening 136 and may also extend 360 degrees around the body 130.

The structure and function of the second recliner mechanism 13 may be similar or identical to that of the first recliner mechanism 12, and therefore, will not be described again in detail.

With continued reference to FIGS. 1-8, a method for manufacturing the first recliner mechanism 12 will now be described in detail. It should be understood that although the method is described with regards to the first recliner mechanism 12, the second recliner mechanism 13 may be manufactured in a similar or identical manner using the method described below. The ratchet plate 57 may be cast or machined. As shown in FIG. 7, a gap ring 138 may be disposed onto the rim 78 of the ratchet plate 57. The gap ring 138 may be made out of a polymeric material (e.g., mylar), for example. In some configurations, the gap ring 138 may be made out of a paper material (e.g., coated paper, cotton paper, wax paper or card stock), for example. A thickness of the flange 132 may be thicker than a thickness of the gap ring 138. In some configurations, the thickness of the gap ring 138 may be thicker than the thickness of the flange 132.

Next, as shown in FIG. 7, the encapsulation ring 42 may be press-fitted onto the guide plate 56 of the recliner heart 34 such that the gap ring 138 is sandwiched between the rim 78 of the ratchet plate 57 and the flange 132 of the encapsulation ring 42. Stated another way, the gap ring 138 may be disposed axially between the rim 78 and the flange 132 (i.e., disposed between the rim 78 and the flange 132 in a direction along or parallel to an axis that the guide plate 56 and the ratchet plate 57 rotate relative to each other about). In this way, a first surface 140 of the gap ring 138 may contact a surface 142 of the rim 78 and a second surface 144 of the gap ring 138 opposite the first surface 140 may contact a surface 146 of the flange 132.

The flange 132 of the encapsulation ring 42 may be heated using a laser, induction heating, a hot plate, a flame, hot air, or any other suitable method. In this way, the gap ring 138 is burned off or melted off of the rim 78 of the ratchet plate 57 to form a clearance gap 148 (FIG. 8) in place of the gap ring 138 between the flange 132 and the rim 78, thereby allowing the ratchet plate 57 to more freely rotate with the seatback 22 relative to the encapsulation ring 42 and the guide plate 56. In some configurations, the encapsulation ring 42 may be heated such that the gap ring 138 is only partially burned off or melted off of the rim 78 to form a clearance gap between the flange 132 and the gap ring 138.

It should be understood that a clearance gap may be formed using methods other than heating the encapsulating ring 42. For example, in some configurations, the guide plate 56 and the encapsulation ring 42 may be supported and held stationary while the ratchet plate 57 is rotated (e.g., at 500 rpm) via a tool (not shown). In this way, friction generated between the encapsulation ring 42 and the gap ring 138 causes the gap ring 138 to at least partially wear away, burn or melt off, or otherwise dissipate, thereby forming the clearance gap 148 between the flange 132 and the rim 78. In some configurations, a solvent could be used to at least partially dissolve the gap ring 138 to form the clearance gap 148.

Finally, the encapsulation ring 42 may be further attached to the guide plate 56 (e.g., by welding). A lubricant (e.g., grease) may be provided in the clearance gap 148 (i.e., between the second flange 134 and the rim 78) to further lubricate the first recliner mechanism 12. In some configurations, a lubricant may be provided between the flange 132 and the rim 78 prior to forming the clearance gap 148. In this way, the lubricant absorbs heat from the first recliner mechanism 12 that is generated during forming of the clearance gap 148.

One benefit of the method for manufacturing the first recliner mechanism 12 as described above is the improved performance of the first recliner mechanism 12 when the seatback 22 is rotated. Another benefit of the method for manufacturing the first recliner mechanism 12 as described above is the speed in which the first recliner mechanism 12 may be manufactured (i.e., setting of the clearance gap between the encapsulation ring and the guide plate). It should be understood that the method described above can also be used for other components of recliner hearts/recliner mechanisms that may require clearance gaps therebetween.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for manufacturing a recliner mechanism comprising:
movably attaching a first plate of a recliner heart to a second plate of the recliner heart;
positioning a gap ring onto the first plate of the recliner heart;
positioning an encapsulation ring around the first and second plates such that the gap ring is disposed axially between the first plate and the encapsulation ring; and
rotating the first plate while the second plate and encapsulating ring are held stationary to generate friction, such that the generated friction burns or melts off at least a portion of the gap ring to form a clearance gap between the first plate and the encapsulation ring.

2. The method of claim 1, wherein the first plate includes a plate surface and a rim extending around a periphery of the plate surface, and wherein the gap ring is positioned onto the rim of the first plate.

3. The method of claim 2, wherein the encapsulation ring includes a body and a flange extending radially inwardly from an axial end of the body, and wherein the gap ring is positioned between the flange and the rim of the first plate.

4. The method of claim 1, wherein positioning the encapsulation ring around the first and second plates includes press-fitting the encapsulation ring onto the second plate.

5. The method of claim 1, wherein the gap ring is formed from a polymeric material and/or a paper material.

6. The method of claim 1, wherein the first plate is disposed axially between the second plate and a flange of the encapsulation ring, and wherein the clearance gap is formed axially between the first plate and the flange.

7. A method for manufacturing a recliner mechanism comprising:
movably attaching a first plate of a recliner heart to a second plate of the recliner heart;
positioning a gap ring onto the first plate of the recliner heart;
positioning an encapsulation ring around the first and second plates such that the gap ring is disposed axially between the first plate and the encapsulation ring, a first surface of the gap ring contacts the first plate and a second surface of the gap ring opposite the first surface contacts the encapsulation ring;
press fitting the encapsulation ring onto the second plate;
after press fitting the encapsulation ring onto the second plate, rotating the first plate while the second plate and encapsulating ring are held stationary to generate friction, such that the generated friction burns or melts off at least a portion of the gap ring to form a clearance gap between the first plate and the encapsulation ring; and
welding the encapsulation ring to the second plate of the recliner heart.

8. The method of claim 7, wherein the first plate includes a plate surface and a rim extending around a periphery of the plate surface, and wherein the gap ring is positioned onto the rim of the first plate.

9. The method of claim 8, wherein the encapsulation ring includes a body and a flange extending radially inwardly from an axial end of the body, and wherein the gap ring is positioned between the flange and the rim of the first plate.

10. The method of claim 7, wherein the gap ring is formed from a polymeric material and/or a paper material.

11. The method of claim 7, wherein the first plate is disposed axially between the second plate and a flange of the encapsulation ring, and wherein the clearance gap is formed axially between the first plate and the flange.

* * * * *